(12) United States Patent
Radhakrishnan et al.

(10) Patent No.: US 9,953,620 B2
(45) Date of Patent: Apr. 24, 2018

(54) UPDATING IMAGE REGIONS DURING COMPOSITION

(71) Applicant: QUALCOMM Incorporated, San Diego, CA (US)

(72) Inventors: Ramkumar Radhakrishnan, San Diego, CA (US); Dileep Marchya, San Diego, CA (US); Mastan Manoj Kumar Amara Venkata, San Diego, CA (US); Saurabh Shah, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 142 days.

(21) Appl. No.: 14/852,273

(22) Filed: Sep. 11, 2015

(65) Prior Publication Data

US 2017/0032764 A1 Feb. 2, 2017

Related U.S. Application Data

(60) Provisional application No. 62/198,547, filed on Jul. 29, 2015.

(51) Int. Cl.
| | |
|---|---|
| *G06F 3/0485* | (2013.01) |
| *G09G 5/34* | (2006.01) |
| *G09G 5/393* | (2006.01) |
| *G06T 1/60* | (2006.01) |

(52) U.S. Cl.
CPC .......... *G09G 5/393* (2013.01); *G06F 3/0485* (2013.01); *G06T 1/60* (2013.01); *G09G 5/34* (2013.01); *G09G 2320/103* (2013.01); *G09G 2360/127* (2013.01)

(58) Field of Classification Search
None
See application file for complete search history.

(56) References Cited

U.S. PATENT DOCUMENTS

| | | | |
|---|---|---|---|
| 6,369,830 B1 | 4/2002 | Brunner et al. | |
| 7,313,764 B1 * | 12/2007 | Brunner | G09G 5/34 |
| | | | 345/684 |
| 9,213,556 B2 * | 12/2015 | Abiezzi | G06F 9/4445 |

(Continued)

FOREIGN PATENT DOCUMENTS

| | | |
|---|---|---|
| CN | 103702054 A | 4/2014 |
| GB | 2489798 A | 10/2012 |

(Continued)

OTHER PUBLICATIONS

International Search Report and Written Opinion from International Application No. PCT/US2016/034796, dated Sep. 23, 2016, (11 pgs.).

(Continued)

*Primary Examiner* — Joni Richer
(74) *Attorney, Agent, or Firm* — Shumaker & Sieffert, P.A.

(57) ABSTRACT

Techniques are described for determining a region to be updated in a frame based on positional changes of one layer from frame-to-frame. The positional changes may be displacement of a layer or removal of a layer from one frame to the next. In addition to the information of the positional changes, the techniques also utilize all areas for which the image content changed, but the position did not, for determining the region to be updated.

11 Claims, 5 Drawing Sheets

(56) References Cited

U.S. PATENT DOCUMENTS

| | | |
|---|---|---|
| 2011/0043533 A1 | 2/2011 | Han et al. |
| 2012/0079401 A1* | 3/2012 | Huang .................. G06F 9/4443 715/763 |
| 2013/0328922 A1 | 12/2013 | Belanger |
| 2014/0078144 A1* | 3/2014 | Berriman ................ A63F 13/10 345/426 |
| 2014/0354664 A1 | 12/2014 | Brown |

FOREIGN PATENT DOCUMENTS

| | | |
|---|---|---|
| JP | 2002015328 A | 1/2002 |
| WO | 02052506 A1 | 7/2002 |
| WO | 2014042896 A1 | 3/2014 |

OTHER PUBLICATIONS

Response to Written Opinion from corresponding PCT Application Serial No. PCT/US2016/034796 filed on Feb. 28, 2017 (26 pages).
Anonymous: "JP 2002-015328 Full Contents Claim+ Detailed Description Description of Drawings Drawings", Jan. 18, 2002 (Jan. 18, 2002), XP55386713, [retrieved on Jan. 9, 2016] (14 pages).
Lengyel J., et al., "Rendering With Coherent Layers", SIGGRAPH '97 Proceedings of the 24th annual conference on Computer graphics and interactive techniques, Aug. 3, 1997, XP000765821, pp. 233-242.
Second Written Opinion from corresponding PCT Application Serial No. PCT/US2016/034796 dated Jul. 7, 2017 (9 pages).
International Preliminary Report on Patentability from corresponding PCT Application Serial No. PCT/US2016/034796 dated Oct. 19, 2017 (36 pages).

\* cited by examiner

FRAME N+1

FRAME N

UPDATING IMAGE REGIONS DURING COMPOSITION

This application claims the benefit of U.S. Provisional Application No. 62/198,547, filed Jul. 29, 2015, the entire content of which is incorporated herein by reference.

TECHNICAL FIELD

This disclosure relates to displaying image content, and more particularly, to updating image content to be displayed.

BACKGROUND

A graphics processing unit (GPU), a video processor, or a camera processor generates image content, referred to as a surface/window/layer, and stores the image content in a layer buffer. A display processor retrieves the image content from the layer buffer, composes the image content into a frame, and outputs the composed frame for display. The generated image content includes a plurality of layers (e.g., distinct portions of the frame), and the display processor composes the layers together for display.

SUMMARY

In general, the disclosure describes techniques for determining an area of an image frame that is to be updated. For example, processing circuitry may utilize information identifying a change in position of one or more layers from one image frame to the next image frame. The change in position may be a displacement (e.g., change from one x-y position to the next x-y position) of the one or more layers or a removal of at least one of the one or more layers. In addition to the information identifying a change in position of the one or more layers, the processing circuitry may utilize a set of layers having a position that did not change from the first image frame to the second image frame and having image content that changed from the first image frame to the second image frame. In this way, when there is a change in position of one or more layers from one image frame to the next, a display processor may compose only the determined area that is to be updated.

In one example, the disclosure describes a method of image display, the method comprising determining one or more layers having a position that did not change from a first image frame to a second, subsequent image frame and having image content that changed from the first image frame to the second image frame, determining a region that needs to be updated in the second image frame based on a construct encompassing one or more layers having a position that changed from the first image frame to the second image frame and one or more constructs encompassing respective layers of the determined set of one or more layers, causing the determined region to be composed in the second image frame without updating any region other than the determined region in the second image frame, and displaying the composed second image frame on the display device.

In one example, the disclosure describes a device for image display, the device comprising a memory configured to store position information of a first image frame, and processing circuitry. The processing circuitry configured to determine, based on the stored information, one or more layers having a position that did not change from the first image frame to a second image frame and having image content that changed from the first image frame to the second image frame, determine a region that needs to be updated in the second image frame based on a construct encompassing one or more layers having a position that changed from the first image frame to the second image frame and one or more constructs encompassing respective layers of the determined set of one or more layers, cause the determined region to be composed in the second image frame without updating any region other than the determined region in the second image frame, and cause the composed second image frame to be displayed on a display device.

In one example, the disclosure describes a computer-readable storage medium having instructions stored thereon that when executed cause one or more processors to determine one or more layers having a position that did not change from a first image frame to a second, subsequent image frame and having image content that changed from the first image frame to the second image frame, determine a region that needs to be updated in the second image frame based on a construct encompassing one or more layers having a position that changed from the first image frame to the second image frame and one or more constructs encompassing respective layers of the determined set of one or more layers, cause the determined region to be composed in the second image frame without updating any region other than the determined region in the second image frame, and display the composed second image frame on a display device.

In one example, the disclosure describes a device for image display, the device comprising means for determining one or more layers having a position that did not change from a first image frame to a second, subsequent image frame and having image content that changed from the first image frame to the second image frame, means for determining a region that needs to be updated in the second image frame based on a construct encompassing one or more layers having a position that changed from the first image frame to the second image frame and one or more constructs encompassing respective layers of the determined one or more layers, means for causing the determined region to be composed in the second image frame without updating any region other than the determined region in the second image frame, and means for displaying the composed second image frame on a display device.

The details of one or more examples are set forth in the accompanying drawings and the description below. Other features, objects, and advantages will be apparent from the description, drawings, and claims.

DETAILED DESCRIPTION

Figure 1:
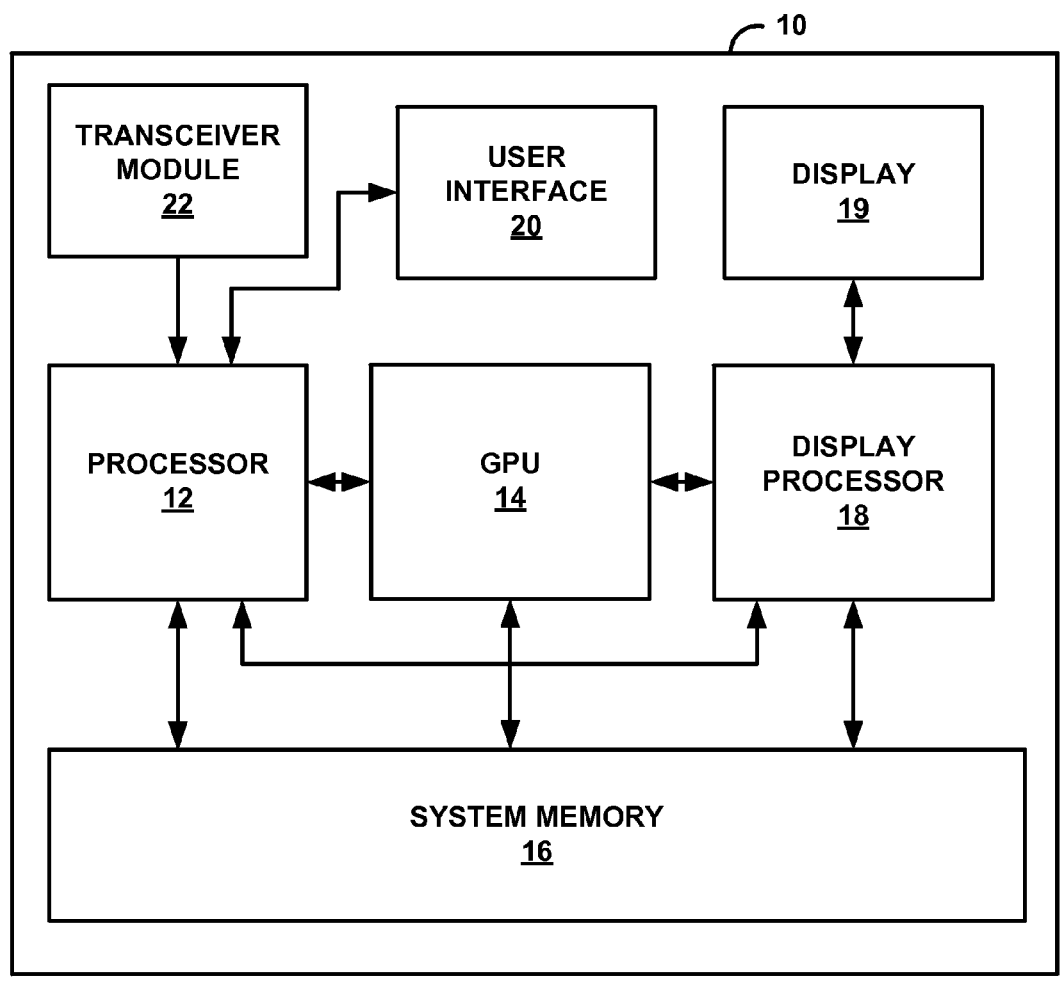
FIG. 1 is a block diagram illustrating an example device for image composition and display in accordance with one or more example techniques described in this disclosure.

Various applications executing on a processor, as well as operating system level operations, create image content for display. As an example, an application executing on the processor may generate image content for the current date and time, another application executing on the processor may generate image content for the background and/or edges of a display, another application executing on the processor may generate image content for indicating an audio volume level, and so forth. As additional examples, a video decoder may decode video data for display in at least a portion of an image frame. Other examples exist, and the techniques are generally related to various examples of where image content is generated for display.

Each of the generated image contents may be considered as a separate layer, and a system memory may include a layer buffer that stores each of the layers. For example, a graphics processing unit (GPU) may generate the image content for the wallpaper, time, volume, etc., and each of these may be layers stored in respective portions of a layer buffer. The processor may instruct a display processor to retrieve the layers from the layer buffer and compose the layers together to form the composed image (i.e., a composite image that combines the layers) that the display processor displays. However, in some cases, the display processor may not have sufficient resources to perform the composition, and shares the composition tasks with other components such as the GPU.

Although other units such as the GPU may assist with composition, from a processing efficiency and proper resource utilization perspective, it may be beneficial for the display processor to perform the composition so that other units can perform their respective functions (e.g., so that clock cycles are not wasted by the GPU to perform composition tasks while other GPU tasks are delayed). One way to ensure that the display processor performs the composition, instead of sharing the task with other components, is to limit the amount of area that needs to be composed. For example, if only some of layers changed from one image frame to the next, it may be beneficial to compose only the changed portions instead of all layers and for the remaining portions to use the previous composed frame for display. For instance, the display may be refreshed every few milliseconds (e.g., to achieve 30 frames per second), and the display processor may retrieve and compose the layers from the layer buffer every few milliseconds. By retrieving and composing only the layers that change every refresh of the display, and not retrieving and composing layers that have not changed since the last refresh, the amount of data the display processor needs to retrieve will be reduced.

In some cases, if the position of one or more layers changed (e.g., displacement or removal of one or more layers), and not just the image content, some techniques may not be able to properly address such a situation and result in a corrupted frame. To avoid corrupting the frame, these other techniques may perform full composition on all layers, which may be inefficient.

In accordance with the example techniques described in this disclosure, processing circuitry may determine a limited area that should be updated, rather than requiring full composition, even in the situation where there is a change in position of one or more layers from one image frame to the next. For example, the processing circuitry may determine a so called "dirty region" or region of interest (ROI) that is to be updated based on a construct (e.g., a rectangle) encompassing the one or more layers in a first image frame whose position changed (e.g., having a position that changed) and one or more constructs (e.g., rectangles) encompassing respective layers of a set of layers in a second image frame, where the set of layers include layers whose image content changed (e.g., having image content that changed), but whose position from one frame to the next did not change (e.g., having a position that did not change from one frame to the next). In this disclosure, the phrase "a region that needs to be updated" means the same as a dirty region.

By utilizing positional information for determining the region that needs to be updated (e.g., dirty region or ROI), the display processor may update only that region. As described above, other techniques may not rely on positional change information to determine the area to update (e.g., the region that needs to be updated), and therefore incorrectly determine the area to update, resulting in a corrupted frame, or update the entire frame even if only a small area changed. The techniques described in this disclosure may provide power savings by composing only the updated region and avoid full frame composition (i.e., composition of the entire frame) by the display processor and/or GPU, as well as provide bandwidth efficiency by reducing the amount of data that needs to be retrieved from the layer buffer.

One example of the processing circuitry that performs the example techniques is a processor, such as a central processing unit (CPU). However, the techniques are not so limited. In some examples, the display processor or some other processing unit may perform the techniques described in this disclosure, and in such examples, the processing circuitry may include the display processor or one or more of these other processing units. The processing circuitry may also refer to a combination of the processor (e.g., CPU) and the display processor. Accordingly, the term "processing circuitry" is used to generally refer to integrated circuitry components that perform the example techniques and may include the processor (CPU, application processor, or GPU), the display processor, a combination of the two, or some other combination of components.

FIG. 1 is a block diagram illustrating an example device for image display in accordance with one or more example techniques described in this disclosure. FIG. 1 illustrates device 10, examples of which include, but are not limited to, video devices such as media players, set-top boxes, wireless handsets such as mobile telephones (e.g., so-called smartphones), personal digital assistants (PDAs), desktop computers, laptop computers, gaming consoles, video conferencing units, tablet computing devices, and the like.

In the example of FIG. 1, device 10 includes processor 12, graphics processing unit (GPU) 14, system memory 16, display processor 18, display 19, user interface 20, and transceiver module 22. In examples where device 10 is a mobile device, display processor 18 is a mobile display processor (MDP). In some examples, such as examples where device 10 is a mobile device, processor 12, GPU 14, and display processor 18 may be formed as an integrated circuit (IC). For example, the IC may be considered as a processing chip within a chip package, and may be a system-on-chip (SoC). In some examples, two of processors 12, GPU 14, and display processor 18 may be housed together in the same IC and the other in a different integrated circuit (i.e., different chip packages) or all three may be housed in different ICs or on the same IC. However, it may be possible that processor 12, GPU 14, and display processor 18 are all housed in different integrated circuits in examples where device 10 is a mobile device.

Examples of processor 12, GPU 14, and display processor 18 include, but are not limited to, one or more digital signal processors (DSPs), general purpose microprocessors, application specific integrated circuits (ASICs), field programmable logic arrays (FPGAs), or other equivalent integrated or discrete logic circuitry. Processor 12 may be the central processing unit (CPU) of device 10. In some examples, GPU 14 may be specialized hardware that includes integrated and/or discrete logic circuitry that provides GPU 14 with massive parallel processing capabilities suitable for graphics processing. In some instances, GPU 14 may also include general purpose processing capabilities, and may be referred to as a general purpose GPU (GPGPU) when implementing general purpose processing tasks (i.e., non-graphics related tasks). Display processor 18 may also be specialized integrated circuit hardware that is designed to retrieve image content from system memory 16, compose the image content into an image frame, and output the image frame to display 19.

Processor 12 may execute various types of applications. Examples of the applications include web browsers, e-mail applications, spreadsheets, video games, or other applications that generate viewable objects for display. System memory 16 may store instructions for execution of the one or more applications. The execution of an application on processor 12 causes processor 12 to produce graphics data for image content that is to be displayed. Processor 12 may transmit graphics data of the image content to GPU 14 for further processing based on and instructions or commands that processor 12 transmits to GPU 14.

Processor 12 may communicate with GPU 14 in accordance with a particular application processing interface (API). Examples of such APIs include the DirectX® API by Microsoft®, the OpenGL® or OpenGL ES® by the Khronos group, and the OpenCL™; however, aspects of this disclosure are not limited to the DirectX, the OpenGL, or the OpenCL APIs, and may be extended to other types of APIs. Moreover, the techniques described in this disclosure are not required to function in accordance with an API, and processor 12 and GPU 14 may utilize any technique for communication.

System memory 16 may be the memory for device 10. System memory 16 may comprise one or more computer-readable storage media. Examples of system memory 16 include, but are not limited to, a random access memory (RAM), an electrically erasable programmable read-only memory (EEPROM), flash memory, or other medium that can be used to carry or store desired program code in the form of instructions and/or data structures and that can be accessed by a computer or a processor.

In some aspects, system memory 16 may include instructions that cause processor 12, GPU 14, and/or display processor 18 to perform the functions ascribed in this disclosure to processor 12, GPU 14, and/or display processor 18. Accordingly, system memory 16 may be a computer-readable storage medium having instructions stored thereon that, when executed, cause one or more processors (e.g., processor 12, GPU 14, and/or display processor 18) to perform various functions.

System memory 16 is a non-transitory storage medium. The term "non-transitory" indicates that the storage medium is not embodied in a carrier wave or a propagated signal. However, the term "non-transitory" should not be interpreted to mean that system memory 16 is non-movable or that its contents are static. As one example, system memory 16 may be removed from device 10, and moved to another device. As another example, memory, substantially similar to system memory 16, may be inserted into device 10. In certain examples, a non-transitory storage medium may store data that can, over time, change (e.g., in RAM).

In the techniques described in this disclosure, processor 12 may instruct GPU 14 to render graphical image content. For instance, an application executing on processor 12 may generate graphical image content for a wallpaper (e.g., background) to be displayed, another application executing on processor 12 may generate graphical image content to indicate the time of day, another application execution on processor 12 may generate graphical image content to indicate wireless signal strength (e.g., for a device supporting wireless communication such as a smartphone, tablet, computer, television, gaming console or the like), and so forth. A framework of processor 12 (e.g., a software module executing on processor 12, hardware on processor 12, or a combination thereof) may instruct GPU 14 to render the graphical image content generated by each of these applications. One example of the framework of processor 12 may be the operating system (OS) executing on processor 12.

In turn, GPU 14 renders the graphical image content generated by each of these applications. For example, the respective graphical image content from respective applications may be considered as respective layers. Keeping with the above example, one layer is the wallpaper, another layer is the time information, another layer is wireless signal strength, and so forth. GPU 14 may store the resulting layers in a layer buffer in system memory 16.

Display processor 18 may retrieve the respective layers from the layer buffer in system memory 16 and compose the layers to form a single image frame. Display processor 18 may then output the image frame to display 19. Composing of the layers may be considered as stitching the layers together or otherwise combining the layers to form one image. As an example, the time information may overlap the background wallpaper, and display processor 18, as part of the composing, may cover the portion of the background wallpaper that is covered by the time information and display the time information on-top-of the background wallpaper.

In general, display processor 18 is well suited for image composition. However, resource limitations may require display processor 18 to share the composition task with other components. For instance, display processor 18 may be coupled to system memory 16 via a plurality of "pipes" (e.g., hardwire connections to system memory 16). Display processor 18 may be able to retrieve one layer from one pipe. If there are more layers than pipes, then display processor 18 may not be able to retrieve all layers at once, which slows down composition. In such cases, GPU 14 may perform some of the composition tasks. There are other examples of resource constraints where GPU 14 may need to perform some of the composition tasks, and having limited pipes is one such example.

If GPU 14 is tasked with performing some of the composition, GPU 14 may be unavailable to perform tasks for which GPU 14 was slated (e.g., image rendering). Therefore, while GPU 14 may assist with composition, it may be preferable for display processor 18 to perform the composition.

One way to assist with not overloading the resources of display processor 18 is to limit the number of layers that need to be retrieved from the layer buffer of system memory 16. From one image frame ($N^{th}$ frame) to the next image frame ($N+1^{th}$ frame), not all layers may change (e.g., wallpaper layer may remain constant, but the time information may change). Therefore, for frame N+1, display processor 18 may not need to compose all layers from the layer buffer. Rather, display processor 18 may compose only those layers that changed from frame-to-frame.

The techniques described in this disclosure represent examples for computing a region that needs to be updated, also referred to as a region of interest (ROI) or a dirty region, so that display processor 18 only retrieves those layers that need to be updated rather than all layers. For example, the techniques described in this disclosure may account for changes in the position of a layer from one frame to the next in determining the dirty region that needs to be updated. By accounting for the changes in the position, and not just the change in image content, the techniques described in this disclosure may allow for better ROI computation.

If the ROI is computed incorrectly, then display processor 18 may not compose the correct layers, resulting in a corrupted frame (e.g., a displayed frame with errors, such as visible artifacts, in the displayed content such as content left over from the previous frame that should have been removed). Accordingly, with the techniques described in this disclosure, display processor 18 may compose the correct layers, resulting in a reduction in errors in the displayed content. Otherwise, if not implementing the techniques described in this disclosure and to avoid corrupted frames, display processor 18 may need to compose all layers, which as described above may be inefficient due to display processor 18 needing to share the composition task with GPU 14 (as an example).

In this disclosure, a change in position of a layer refers to a displacement of a layer (e.g., a shifting from one position in one frame to another position in the next frame) or a removal of a layer (e.g., the layer exists in one frame and is no longer present in the next frame). Processor 12 may determine that a position of one or more layers changed from a first image frame to a second image frame. In this example, the first image frame is an image frame that is displayed, and the second image frame is an image frame whose image content has been generated but has not yet been displayed. Processor 12 may also determine a set of one or more layers whose position did not change from the first image frame to the second, subsequent image frame and whose image content changed from the first image frame to the second image frame. These layers in a set of one or more layers are referred to as dirty rectangles. Therefore, processor 12 may determine all dirty rectangles.

In response to determining that the position of the one or more layers changed, processor 12 may determine a region that needs to be updated in the second image frame (e.g., dirty region, an ROI, or the area to be updated) based on a construct, such as a rectangle, that encompasses the one or more layers in the first image frame whose position changed and one or more constructs that encompass respective layers of the set of one or more layers in the second image frame (e.g., all dirty rectangles). Processor 12 may then cause display processor 18 to compose the layers in the determined region (i.e., computed ROI) and avoid causing display processor 18 to compose any region other than the determined region to be composed in the second image frame. For example, processor 12 may cause display processor 18 to compose the layers in the determined region in the second image frame without updating any region other than the determined region in the second image frame. For the other regions (e.g., those other than determined dirty region), display processor 18 may utilize the image content of the previous frame (e.g., the first frame). In some examples, processor 12 may cause display processor 18 to display the composed second image frame on a display device (e.g., display 19)

It should be understood that although processor 12 is described as implementing the example techniques described in this disclosure, the techniques should not be considered so limited. In general, the techniques described in this disclosure may be performed by processing circuitry.

Processing circuitry refers to circuit components (e.g., integrated circuit components) that are configured to perform the example techniques. For instance, processor 12 is one example of the processing circuitry. Display processor 18 may be another example of the processing circuitry. In some cases, the processing circuitry may include both processor 12 and display processor 18. For ease of description, the examples are described with respect to processor 12, but the techniques may be implemented more generally with any of a variety of processing circuitry such as GPU 14 or display processor 18.

Also, processing circuitry may display the composed second image frame on display 19. In one example, processor 12 may cause display processor 18 to display the composed second image frame on display 19. In one example, display processor 18 may display the composed second image frame on display 19.

Device 10 may also include display 19, user interface 20, and transceiver module 22. Device 10 may include additional modules or units not shown in FIG. 1 for purposes of clarity. For example, device 10 may include a speaker and a microphone, neither of which are shown in FIG. 1, to effectuate telephonic communications in examples where device 10 is a mobile wireless telephone. Furthermore, the various modules and units shown in device 10 may not be necessary in every example of device 10. For example, user interface 20 and display 19 may be external to device 10 in examples where device 10 is a desktop computer. As another example, user interface 20 may be part of display 19 in examples where display 19 is a touch-sensitive or presence-sensitive display of a mobile device.

Display 19 may comprise a liquid crystal display (LCD), a cathode ray tube (CRT) display, a plasma display, a touch-sensitive display, a presence-sensitive display, or another type of display device. Examples of user interface 20 include, but are not limited to, a trackball, a mouse, a keyboard, and other types of input devices. User interface 20 may also be a touch screen and may be incorporated as a part of display 19. Transceiver module 22 may include circuitry to allow wireless or wired communication between device 10 and another device or a network. Transceiver module 22 may include modulators, demodulators, amplifiers and other such circuitry for wired or wireless communication.

Figure 2:
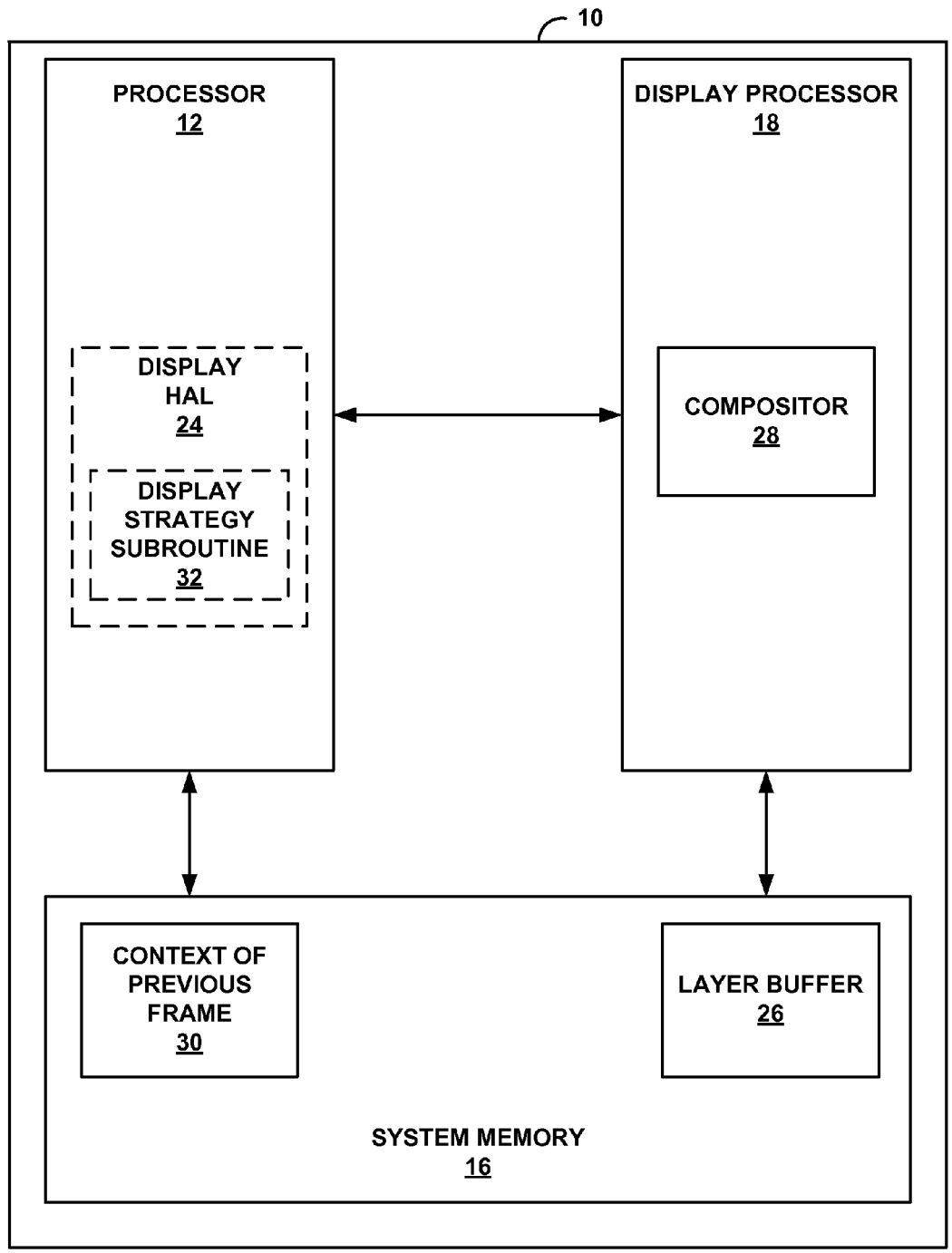
FIG. 2 is a block diagram illustrating components of the device illustrated in FIG. 1 in greater detail.

FIG. 2 is a block diagram illustrating components of the device illustrated in FIG. 1 in greater detail. As illustrated, processor 12 executes display hardware abstraction layer (HAL) 24. Display HAL 24 is the interface that allows processor 12 to communicate with display processor 18. For instance, display HAL 24 provides a mechanism for processor 12 to access display processor 18. In accordance with the techniques described in this disclosure, one of the subroutines that display HAL 24 executes is display strategy subroutine 32. As described in more detail, display strategy subroutine 32 may be configured to perform the example techniques described in this disclosure to compute the ROI (e.g., dirty region) of an image frame that should be updated (e.g., region that needs to be updated). Again, rather than processor 12 implementing the techniques via display strategy subroutine 32, display processor 18 or some other processing unit may perform the techniques via execution of a display strategy subroutine similar to display strategy subroutine 32, via hardwired components, or via a combination of both. For ease, the techniques are described with respect to processor 12.

It should be understood that the techniques are described with respect to display HAL 24 and display strategy subroutine 32 executing on processor 12 causing processor 12 to perform the example techniques for ease of understanding. However, processor 12 may include hardware units that cause processor 12 to perform the example techniques. In some cases, a combination of firmware, software, and hardware may cause processor 12 to perform the example techniques.

In the example illustrated in FIG. 2, GPU 14 rendered and stored layers of an image frame in layer buffer 26 of system memory 16. Processor 12, via display HAL 24, instructed display processor 18 to retrieve the layers of the image frame from layer buffer 26. Compositor 28 of display processor 18 composed the layers together and display processor 18 displayed the resulting composed frame on display 19. Compositor 28 may be a fixed-function hardware unit, but may be programmable in some examples. Compositor 28 may be integrated circuitry that is part of display processor 18.

In the techniques described in this disclosure, display strategy subroutine 32 may utilize the layer information such as position information of this image frame to determine the region that is to be updated for the next image frame. To avoid confusion, in this disclosure, the frame that was composed and displayed is frame N, and the next frame to be composed and displayed is frame N+1. For instance, display strategy subroutine 32 may determine the region that needs to be updated in frame N+1 based on the position information of the layer is frame N, and then instruct display processor 18 to cause compositor 28 to compose only the region that needs to be updated in frame N+1 and display the updated region and the remaining regions, where the remaining regions come from frame N. Also, because frame N is previous to frame N+1, frame N is also referred to as the previous frame, and frame N+1 is referred to as the current frame. Stated another way, frame N is a first frame, and frame N+1 is a second, subsequent frame.

System memory 16 may also store context of previous frame 30. Context of previous frame 30 may be information of the previous frame composition such as the display positions of all layers in frame N. There may be various ways in which context of previous frame 30 is generated. As one example, GPU 14 may generate context of previous frame 30 as part of the rendering. As another example, processor 12 may determine the positions of each of the layers in frame N.

After GPU 14 stores the layers of frame N+1, display strategy subroutine 32 may analyze the position of the layers frame N and frame N+1 to determine whether there is any change in a position from frame N to frame N+1 (e.g., displacement of a layer or removal of a layer). Based on the determined change, display strategy subroutine 32 may compute ROI that needs to be updated on display 19.

As an example, processor 12, by execution of display strategy subroutine 32 of display HAL 24, may compute the ROI (e.g., dirty region or the region that needs to be updated) based on the following formula:

X=Displaced layer
PX1=Display Rectangle of X at Nth frame
PX2=Display Rectangle of X at N+1th frame
Y=Removed layer
PY1=Display Rectangle of Y at Nth frame Computed ROI=Union(Union($PX1,PX2$) of all displaced layers, $PY1$ of all removed layers, All Dirty Rectangles))

For instance, display strategy subroutine 32 may determine that a position of one or more layers changed from a first image frame (e.g., frame N) to a second image frame (e.g., frame N+1). In examples where there is only displacement of one or more layers, there may be no PY1, and in examples where there is only removal of layers, there may be no PX1, PX2. Display strategy subroutine 32 may determine one or more layers whose position did not change from the first image frame to the second image frame and whose image content changed from the first image frame to the second image frame. For instance, the dirty rectangles in the above equation for the computed ROI refer to constructs encompassing layers whose position may not change, but whose content changed frame-to-frame. An example of this is the layer that includes time or signal strength information. Such information is generally displayed in the same position, but the image content from one frame to another may change (e.g., to illustrate a change in the minute or to illustrate more or fewer signal strength bars).

In some examples, the "All Dirty Rectangles" may be considered as dirty rectangles of all non-displaced layers, such as in the case where one or more layers are displaced from one frame to the next, and possibly (but not necessarily) in conditions where there are no layers that were removed. The "All Dirty Rectangles" may also be considered as dirty rectangles of all remaining layers, such as in the case where one or more layers are removed from one frame to the next, and possibly (but not necessarily) in conditions where there are no layers that were displaced. In general, "All Dirty Rectangles" may be considered as a genus for rectangles (e.g., constructs) that encompass layers whose content changes frame-to-frame, but whose position does not change (e.g., there is no displacement and/or no removal).

Also, in response to determining that the position of the one or more layers changed, display strategy subroutine 32 may determine a region that needs to be updated (e.g., computed ROI) based on a construct encompassing the one or more layers whose position changed (e.g., PX1 or PY1 based on whether there is layer displacement or removal) and one or more constructs encompassing respective layers of the set of layers in the second image frame (e.g., all dirty rectangles in the above equation for computed ROI). Display HAL 24 may then cause (e.g., instruct) display processor 18 to compose the determined region (e.g., computed ROI) in the second image frame and avoid causing any region other than the determined region to be composed in the second image frame (e.g., without updating any region other than the determined region in the second image frame). In some examples, processor 12 may then cause display processor 18 to display the composed second image on a display device (e.g., display 19).

In the above example, the construct that encompasses the one or more layers in the first image frame that changed is a rectangle such as PX1 or PY1. The constructs that encompass the one or more layer may also be rectangles (e.g., all dirty rectangles). However, the constructs do not necessarily have to be rectangles.

In examples where there is displacement of the one or more layers, display strategy subroutine 32 may also utilize a construct encompassing the one or more layers in the second image frame to where the position changed (e.g., PX2). For example, a layer from the first image frame may displace from one position in frame N to another position in frame N+1. Display strategy subroutine 32 may utilize a construct of where the layer position was in frame N (PX1) and where the layer position was displaced to in frame N+1 (PX2) (e.g., the final position in the second image frame).

Accordingly, in examples where display strategy subroutine 32 determines that the one or more layers displaced from the first image frame to the second image frame, display strategy subroutine 32 may determine the dirty region based on the following equation: dirty region=union (union (PX1, PX2) of all displaced layers, All Dirty Rectangles). In this example, "All Dirty Rectangles" may be "dirty rectangles of all non-displaced layers." In other words, in examples where display strategy subroutine 32 determines that the one or more layers displaced from the first image frame to the second image frame, display strategy subroutine 32 may determine a first union between a display rectangle of the one or more displaced layers of the first image frame and a display rectangle of the one or more displaced layers of the second image frame (e.g., union (PX1, PX2)), and a second union between a result of the first union and the set of the one or more layers having the position that did not change from the first image frame to the second image frame and having image content that changed from the first image frame to the second image frame (e.g., union(union (PX1, PX2) of all displaced layers, All Dirty Rectangles)).

In examples where the display strategy subroutine 32 determines that the one or more layers in the first image frame were removed from the second image frame, display strategy subroutine 32 may determine the dirty region based on the following equation: union(PY1 of all removed layers, All Dirty Rectangles). In this example, "All Dirty Rectangles" may be "dirty rectangles of all remaining layers." In other words, in examples where the display strategy subroutine 32 determines that the one or more layers in the first image frame were removed from the second image frame, display strategy subroutine 32 may determine a union between a display rectangle of the one or more removed layers of the first image and the set of the one or more layers having the position that did not change from the first image frame to the second image frame and having image content that changed from the first image frame to the second image frame (e.g., union(PY1 of all removed layers, All Dirty Rectangles)).

Figure 3B:
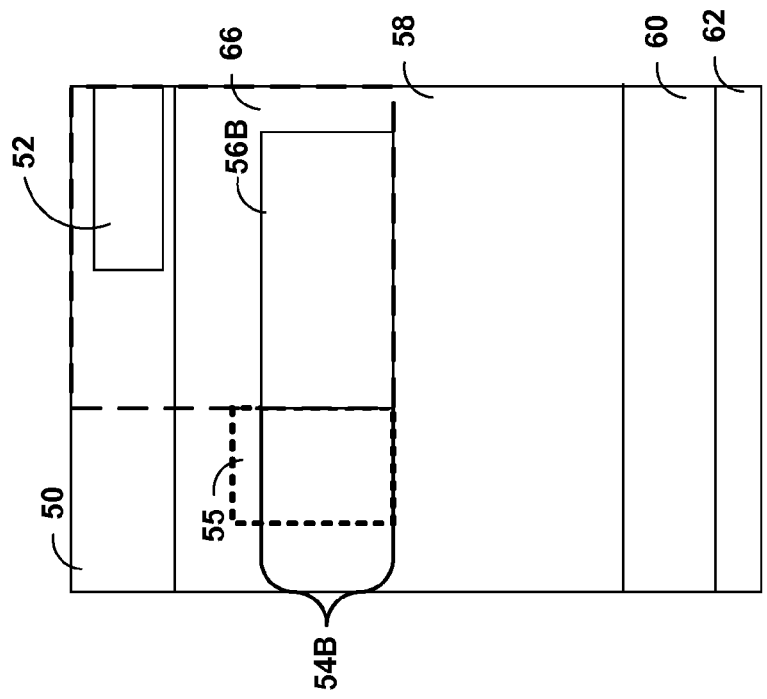
FIGS. 3A and 3B are conceptual diagrams illustrating a determination of an area to be updated that results in a corrupted image frame.
Figure 3A:
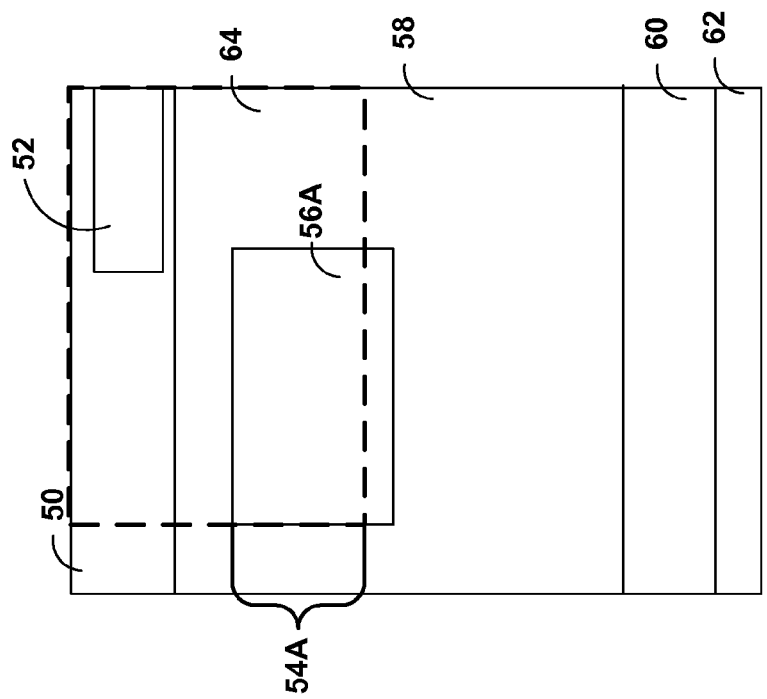

FIGS. 3A and 3B are conceptual diagrams illustrating a determination of an area to be updated that results in a corrupted image frame. For instance, FIGS. 3A and 3B illustrate an example of how, if the positions of layers that were displaced were not accounted for, the ROI may be incorrect, resulting in corrupted composed image frame.

FIG. 3A illustrates frame N and FIG. 3B illustrates frame N+1. FIGS. 3A and 3B illustrate layer 50, which may be the $0^{th}$ layer, and includes dirty rectangle 52. FIGS. 3A and 3B also illustrate a $1^{st}$ layer (layer 60), a $2^{nd}$ layer (layer 62), and a $4^{th}$ layer (layer 58). In FIG. 3A, a $3^{rd}$ layer is identified as layer 54A, but in FIG. 3B, a $3^{rd}$ layer is identified as layer 54B to indicate the displacement. FIG. 3A also illustrates dirty rectangle 56A and a computed ROI 64. FIG. 3B also illustrates dirty rectangle 56B and a computed ROI 66. Layers 50, 58, 60, and 62 may illustrate various items. For instance, layer 50 may illustrate wireless strength of signal, layer 58 may be the wallpaper or background layer, layer 60 may illustrate the call icon, text message icon, icon to execute a web browser, and the like, and layer 62 may illustrate back icon or forward icon, and the like.

In FIG. 3A, which illustrates frame N, only the computed ROI 64 is updated to the screen because there is no geometrical change (e.g., positional change) in frame N relative frame N−1. In FIG. 3B, for frame N+1, layer 54A has been displaced from position (x1, y1), which is the position of layer 54A in FIG. 3A, to (x2, y2), and which is the position of layer 54B is FIG. 3B. In this example, if the position of the layer were not taken into account, the equation to compute the ROI 66 (e.g., area to be updated or dirty region) is union(dirty rectangle 52, dirty rectangle 56B). This is because the image content of both dirty rectangle 52 and dirty rectangle 56B changed, but the position change from position (x1, y1) to (x2, y2) is not accounted for (e.g., the displacement of layer 54A in frame N to layer 54B is frame N+1 is not accounted for). As can be seen in FIG. 3B, the portion of the frame that should have been replaced by the wallpaper remains (i.e., portion 55 still exists in frame N+1, but should not). Therefore, updating the region of frame N+1 computed using techniques that do not rely on the position would result in frame N+1 being corrupted on the screen.

For instance, layer 54A may include a graphic and audio controls. Layer 54B may include only the graphic controls, and the audio controls may become missing. Moreover, the portion 55 which may be a remnant of frame N may persist in frame N+1.

In this way, FIG. 3B illustrates the case where full mobile display processor (MDP) composition with partial update does not function well when a frame's geometry changed in a draw cycle (e.g., in the case of displacement of any layer, removal of any layer, etc.). Therefore, to avoid resulting in a composed image frame that is corrupted, in some cases, processor 12 may instruct display processor 18 to perform full frame composition on frame N+1, rather than just update part of frame N+1, even though only a small portion needs to be updated.

Figure 4:
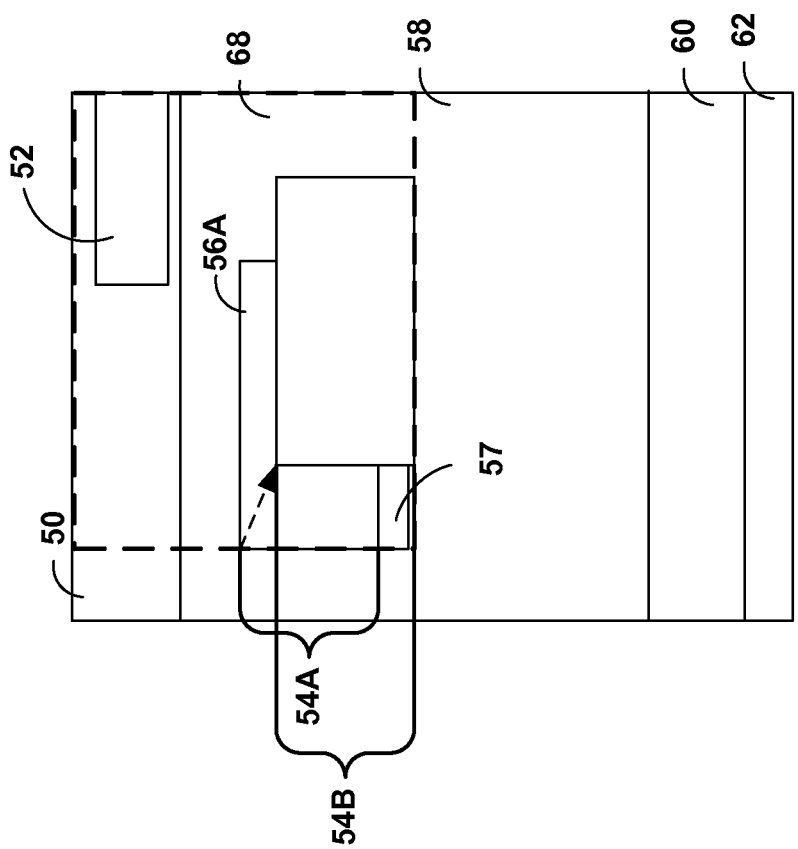
FIG. 4 is a conceptual diagram illustrating a determination of an area in accordance with one or more example techniques described in this disclosure.

FIG. 4 is a conceptual diagram illustrating a determination of an area in accordance with one or more example techniques described in this disclosure. In FIG. 4, the reference numerals that are the same as in FIGS. 3A and 3B refer to similar components, and are therefore, not described in further detail.

In FIG. 4, since the $3^{rd}$ layer 54A has been displaced from position (x1, y1) to the position (x2, y2) of $3^{rd}$ layer 54B, dirty rectangle 57 may not just be the rectangle that encompasses the part that changes, but may be based on the union of the position of layer 54A in frame N and the position of layer 54B in frame N+1. For example, display strategy subroutine 32 may determine the following: dirty rectangle 57=union(Display position of layer 54A on frame N, Display position of layer 54B on frame N+1), and then compute ROI=union(dirty rectangle 52, dirty rectangle 57).

Figure 5:
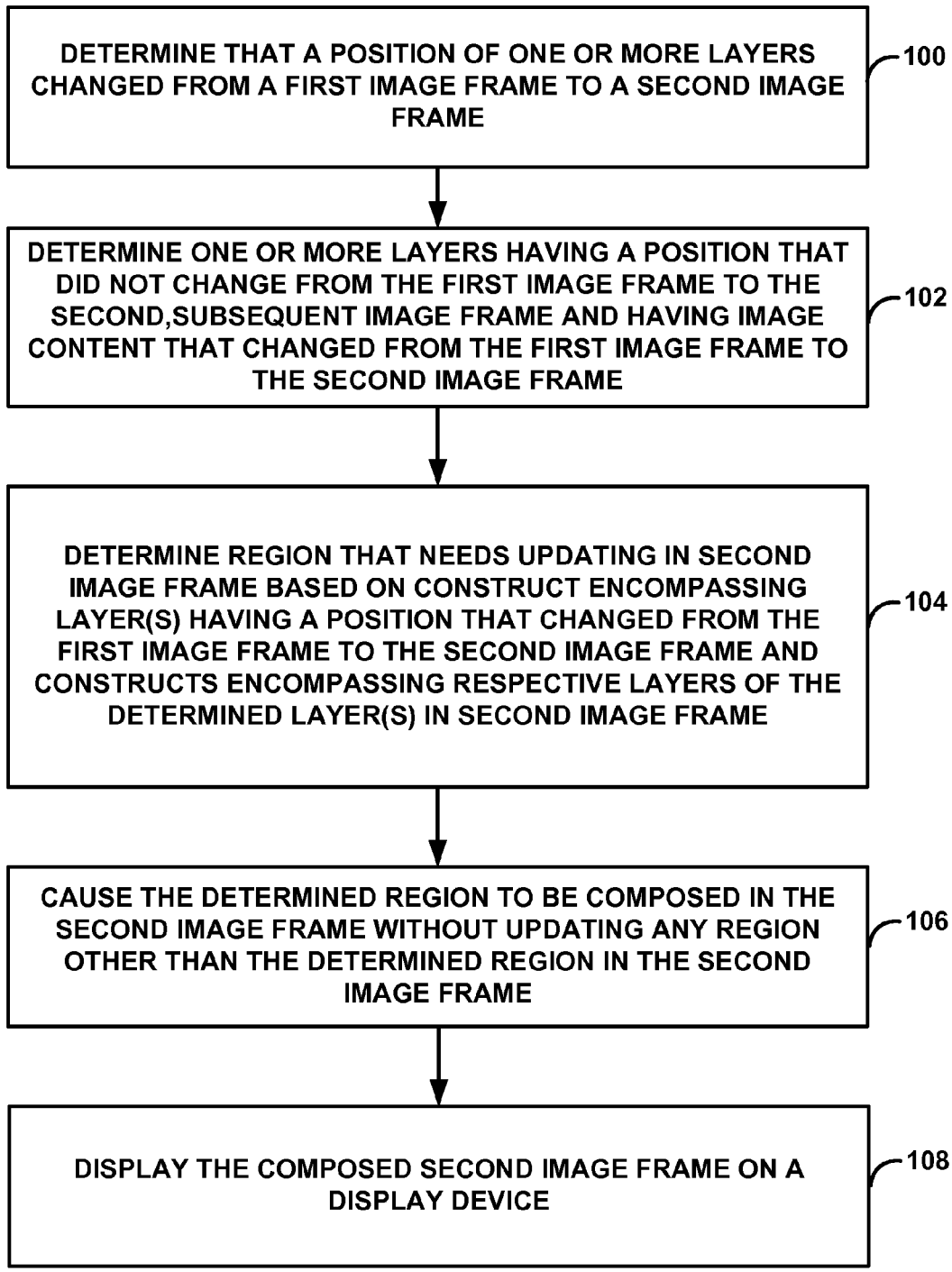
FIG. 5 is a flowchart illustrating an example technique for image composition and display in accordance with this disclosure.

FIG. 5 is a flowchart illustrating an example technique in accordance with this disclosure. For ease, the example illustrated in FIG. 5 is described with respect to display strategy subroutine 32 executing on processor 12. However, the techniques may be performed with processing circuitry, which includes processor 12, display processor 18, or both. Also, the techniques need not necessarily be performed with execution of display strategy subroutine 32, but may be performed with hardwired components of the processing circuitry, or software or firmware similar to display strategy subroutine 32 executing on the processing circuitry.

As illustrated in FIG. 5, display strategy subroutine 32 executing on processor 12 may determine that a position of one or more layers (e.g., $3^{rd}$ layer in FIGS. 3A, 3B, and 4) changed from a first image frame (e.g., frame N) to a second, subsequent image frame (e.g., frame N+1) (100). Display strategy subroutine 32 executing on processor 12 may determine one or more layers whose position did not change from the first image frame to the second image frame (e.g., one or more layers having a position that did not change from the first image frame to the second image frame) and whose image content changed from the first image frame to the second image frame (e.g., all dirty rectangles having image content that changed from the first image frame to the second image frame) (102).

Display strategy subroutine 32 may determine a region that needs to be updated in the second image frame based on a construct encompassing one or more layers having a position that changed from the first image frame to the second image frame and one or more constructs encompassing respective layers of the determined one or more layers (104). For example, display strategy subroutine 32 may determine a region based on PX1 or PY1 (e.g., a construct encompassing the one or more layers having a position that changed) and all dirty rectangles (e.g., one or more constructs encompassing respective layers of the determined one or more layers).

Display HAL 24 may cause display processor 18 to compose the determined region in the second image frame without updating any region other than the determined region in the second image frame (106). Display HAL 24 may cause display processor 18 to display the composed second image frame on a display device (e.g., display 19).

Display HAL 24 may cause display processor 18 to compose the determined region in the second image frame and avoid causing any region other than the determined region to be composed in the second image frame. Rather, display processor 18 may utilize the image content from the first image frame as the image content for the regions other than the determined region in the second image frame.

With the techniques described in this disclosure, power saving may be achieved by composing only the updating region (ROI) and avoiding full frame composition by GPU 14 or display processor 18. Power savings may also be achieved by reducing the bandwidth requirement of display processor 18 (e.g., memory bandwidth requirement to system memory 16) since display processor 18 may only fetch the updating region. For example, since display processor 18 may need to retrieve fewer layers from layer buffer 26, there is pipe savings by dropping layers which fall outside the computed ROI (e.g., dirty region).

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media. In this manner, computer-readable media generally may correspond to tangible computer-readable storage media which is non-transitory. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. It should be understood that computer-readable storage media and data storage media do not include carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of displaying images, the method comprising:
after storage of a plurality of layers in a layer buffer for composition, determining one or more layers of the plurality of layers having a position that did not change from a first image frame to a second, subsequent image frame and having image content that changed from the first image frame to the second image frame, wherein the one or more layers having the position that did not change and having image content that changed are generated from execution of one or more of a first set of applications and are displayed in the first image frame;
after storage of the plurality of layers in the layer buffer for composition, determining one or more layers of the plurality of layers having a position that changed from the first image frame to the second image frame, wherein the one or more layers having the position that changed are generated from execution of one or more of a second set of applications different than the first set of applications, and wherein the one or more layers having the position that changed comprise a first layer that is displaced from the first image frame to the second image frame, and a second layer that was removed from the second image frame;
determining a region that needs to be updated in the second image frame based on a construct encompassing the one or more layers having the position that changed from the first image frame to the second image frame and one or more constructs encompassing respective layers of the determined one or more layers having the position that did not change and having image content that changed, wherein determining the region that needs to be updated comprises determining a first union between a display rectangle of the first layer of the first image frame and a display rectangle of the first layer of the second image frame, and a second union between a result of the first union, a display rectangle of the second layer in the first image frame, and the one or more layers having the position that did not change from the first image frame to the second image frame and having image content that changed from the first image frame to the second image frame;

causing the determined region to be composed in the second image frame without updating any region other than the determined region in the second image frame; and displaying the composed second image frame on a display device.

2. The method of claim 1, wherein the construct comprises a rectangle.

3. The method of claim 1, wherein causing the determined region to be composed comprises instructing a display processor to retrieve image content of the region, and compose the image content of the region, wherein the display processor does not retrieve any other region of the second image frame other than the determined region that needs to be updated in the second image frame.

4. The method of claim 1, wherein causing the determined region to be composed comprises retrieving, with a display processor, image content of the region, and composing, with the display processor, the image content of the region, wherein the display processor does not retrieve any other region of the second image frame other than the determined region that needs to be updated in the second image frame.

5. A device for image display, the device comprising:
a memory configured to store position information of a first image frame and a plurality of layers; and
processing circuitry configured to:
after storage of the plurality of layers in a layer buffer of the memory for composition, determine, based on the stored information, one or more layers of the plurality of layers having a position that did not change from the first image frame to a second image frame and having image content that changed from the first image frame to the second image frame, wherein the one or more layers having the position that did not change and having image content that changed are generated from execution of one or more of a first set of applications and are displayed in the first image frame;
after storage of the plurality of layers in the layer buffer of the memory for composition, determine one or more layers of the plurality of layers having a position that changed from the first image frame to the second image frame, wherein the one or more layers having the position that changed are generated from execution of one or more of a second set of applications different than the first set of applications, and wherein the one or more layers having the position that changed comprise a first layer that is displaced from the first image frame to the second image frame, and a second layer that was removed from the second image frame;
determine a region that needs to be updated in the second image frame based on a construct encompassing the one or more layers having the position that changed from the first image frame to the second image frame and one or more constructs encompassing respective layers of the determined one or more layers having the position that did not change and having image content that changed, wherein to determine the region that needs to be updated, the processing circuitry is configured to determine a first union between a display rectangle of the first layer of the first image frame and a display rectangle of the first layer of the second image frame, and a second union between a result of the first union, a display rectangle of the second layer in the first image frame, and the one or more layers having the position that did not change from the first image frame to the second image frame and having image content that changed from the first image frame to the second image frame;

cause the determined region to be composed in the second image frame without updating any region other than the determined region in the second image frame; and cause the composed second image frame to be displayed on a display device.

6. The device of claim 5, further comprising:
a display processor; and
a processor, wherein the processor comprises the processing circuitry and is configured to cause the display processor to compose the determined region in the second image frame without updating any region other than the determined region in the second image frame.

7. The device of claim 5, wherein the construct comprises a rectangle.

8. The device of claim 5, wherein the processing circuitry comprises a display processor, and wherein to cause the determined region to be composed, the display processor is configured to retrieve image content of the region, and compose the image content of the region, wherein the display processor does not retrieve any other region of the second image frame other than the determined region that needs to be updated in the second image frame.

9. A computer-readable storage medium having instructions stored thereon that when executed cause one or more processors to:
after storage of a plurality of layers in a layer buffer for composition, determine one or more layers of the plurality of layers having a position that did not change from a first image frame to a second, subsequent image frame and having image content that changed from the first image frame to the second image frame, wherein the one or more layers having the position that did not change and having image content that changed are generated from execution of one or more of a first set of applications and are displayed in the first image frame;
after storage of the plurality of layers in the layer buffer for composition, determine one or more layers of the plurality of layers having a position that changed from the first image frame to the second image frame, wherein the one or more layers having the position that changed are generated from execution of one or more of a second set of applications different than the first set of applications, and wherein the one or more layers having the position that changed comprise a first layer that is displaced from the first image frame to the second image frame, and a second layer that was removed from the second image frame;
determine a region that needs to be updated in the second image frame based on a construct encompassing the one or more layers having the position that changed from the first image frame to the second image frame and one or more constructs encompassing respective layers of the determined one or more layers having the position that did not change and having image content that changed, wherein the instructions that cause the one or more processors to determine the region that needs to be updated comprise instructions that cause the one or more processors to determine a first union between a display rectangle of the first layer of the first image frame and a display rectangle of the first layer of the second image frame, and a second union between a result of the first union, a display rectangle of the second layer in the first image frame, and the one or more layers having the position that did not change from the first image frame to the second image frame and having image content that changed from the first image frame to the second image frame;

cause the determined region to be composed in the second image frame without updating any region other than the determined region in the second image frame; and display the composed second image frame on a display device.

10. The computer-readable storage medium of claim 9, wherein the instructions that cause the one or more processors to cause the determined region to be composed comprise instructions that cause the one or more processors to instruct a display processor to retrieve image content of the region, and compose the image content of the region, wherein the display processor does not retrieve any other region of the second image frame other than the determined region that needs to be updated in the second image frame.

11. A device for image display, the device comprising:

means for determining, after storage of a plurality of layers in a layer buffer for composition, one or more layers of the plurality of layers having a position that did not change from a first image frame to a second, subsequent image frame and having image content that changed from the first image frame to the second image frame, wherein the one or more layers having the position that did not change and having image content that changed are generated from execution of one or more of a first set of applications and are displayed in the first image frame;

means for determining, after storage of the plurality of layers in the layer buffer for composition, one or more layers of the plurality of layers having a position that changed from the first image frame to the second image frame, wherein the one or more layers having the position that changed are generated from execution of one or more of a second set of applications different than the first set of applications, and wherein the one or more layers having the position that changed comprise a first layer that is displaced from the first image frame to the second image frame, and a second layer that was removed from the second image frame;

means for determining a region that needs to be updated in the second image frame based on a construct encompassing the one or more layers having the position that changed from the first image frame to the second image frame and one or more constructs encompassing respective layers of the determined one or more layers having the position that did not change and having image content that changed, wherein the means for determining the region that needs to be updated comprises means for determining a first union between a display rectangle of the first layer of the first image frame and a display rectangle of the first layer of the second image frame, and a second union between a result of the first union, a display rectangle of the second layer in the first image frame, and the one or more layers having the position that did not change from the first image frame to the second image frame and having image content that changed from the first image frame to the second image frame;

means for causing the determined region to be composed in the second image frame without updating any region other than the determined region in the second image frame; and means for displaying the composed second image frame on a display device.

\* \* \* \* \*